No. 712,242. Patented Oct. 28, 1902.
S. BARTRON.
CLUTCH OPERATING MECHANISM FOR WINDING DRUMS.
(Application filed Mar. 1, 1902.)
(No Model.)
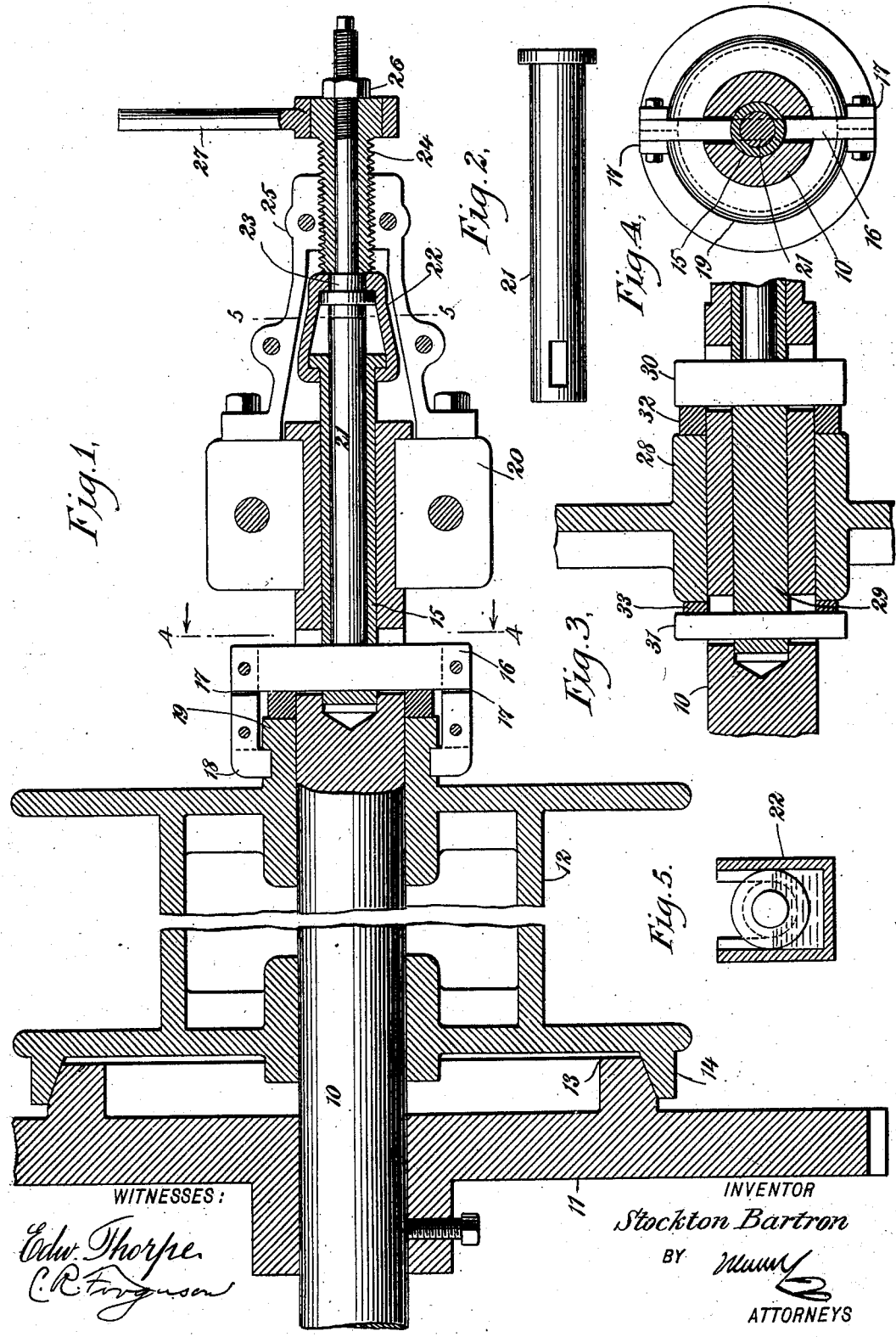
WITNESSES:
Edw. Thorpe
C. R. Ferguson
INVENTOR
Stockton Bartron
BY
ATTORNEYS

UNITED STATES PATENT OFFICE.

STOCKTON BARTRON, OF STROUDSBURG, PENNSYLVANIA.

CLUTCH-OPERATING MECHANISM FOR WINDING-DRUMS.

SPECIFICATION forming part of Letters Patent No. 712,242, dated October 28, 1902.

Application filed March 1, 1902. Serial No. 96,333. (No model.)

*To all whom it may concern:*

Be it known that I, STOCKTON BARTRON, a citizen of the United States, and a resident of Stroudsburg, in the county of Monroe and State of Pennsylvania, have invented a new and Improved Clutch-Operating Mechanism for Winding-Drums, of which the following is a full, clear, and exact description.

This invention relates to improvements in devices for moving a winding-drum into operative connection with a driving-wheel and for disengaging it therefrom; and the object is to provide a simple mechanism by means of which the adjustments may be quickly made while the driving-shaft is moving in its winding direction.

I will describe a clutch-operating mechanism for winding-drums embodying my invention and then point out the novel features in the appended claims.

Reference is to be had to the accompanying drawings, forming a part of this specification, in which similar characters of reference indicate corresponding parts in all the figures.

Figure 1 is a longitudinal section of a clutch-operating mechanism embodying my invention. Fig. 2 is a plan view of a draw-shaft employed. Fig. 3 is a section showing a modification. Fig. 4 is a section on the line 4 4 of Fig. 1, and Fig. 5 is a section on the line 5 5 of Fig. 1.

Referring to the drawings, 10 designates a driving-shaft, to which is rigidly attached a driving-wheel 11, here shown in the form of a gear-wheel, and loosely mounted on the shaft 10 is a winding-drum 12. On one side of the driving-wheel 11 is a clutch member consisting of a rim 13, having a beveled outer surface to engage with a corresponding beveled surface on the inner clutch member 14 on one end of the drum 12.

For a portion of its length the shaft 10 is made tubular to receive a draw rod or shaft, here shown as in the form of a tube 15. At its inner end this draw rod or shaft has a transverse opening through which a cross-head 16 passes. This cross-head has link connections 17 with a collar 18, engaging in an annular channel formed in the hub 19 of the winding-drum. The ring or collar 18 is preferably made in two sections, so that it may be readily applied or detached. In Fig. 1 I have indicated but one of the sections. It will be noted in Fig. 1 that the shaft 10 has outward openings through which the cross-head 16 passes, and these openings are sufficiently long to permit of a movement of the cross-head lengthwise of the shaft.

One end of the shaft 10 has a bearing in a pillow-block 20, and extended through the draw shaft or rod 15 is a thrust-rod 21. The outer end of the draw-shaft 15 extends into and has a bearing in the front wall of a yoke 22, which, as indicated in Fig. 5, is made in the form of a cup to contain oil. The said draw-shaft 15 has a flange at its end to engage against the inner surface of the yoke. Having a bearing in the opposite wall of the yoke is an auxiliary thrust-rod 23, and at its portion within the yoke 22 the said auxiliary thrust-rod is provided with a collar or flange to engage against the inner wall of the yoke. It will be noted that the auxiliary thrust-rod 23 engages at its end closely against the end of the rod 21, and as the rod 21 may rotate relatively to the rod 23 the oil in the yoke 22 will keep the connection lubricated, and it will also lubricate the connection between the draw-rod 15 and its bearing in the yoke.

Mounted on the auxiliary rod 23 is an externally-threaded sleeve 24, which engages with an interior thread formed in a casing 25, bolted or otherwise secured to the pillow-block, and this casing, it will be noted, incloses the yoke 22. This sleeve 24 is practically a portion of the auxiliary rod 23. It is employed, however, to take up or adjust any wear that may occur in the bearings of said auxiliary rod. It is therefore clamped on the auxiliary rod between a shoulder formed at the inner end of the rod and a jam-nut 26, engaging with the threaded portion of the auxiliary rod and bearing against the outer end of the sleeve 24, and also attached to the outer end of the sleeve 24 is an operating-lever 27.

In operation to disengage the clutch connection between the driving-wheel 11 and the drum 12, which in Fig. 1 are indicated as in connection, the lever 27 is to be operated to move the auxiliary shaft carried by the sleeve 24 outward. This auxiliary shaft will cause the yoke 22 to move with it, and consequently the draw-shaft 15 by drawing upon the crosshead 16 will move the winding-drum out of engagement with the clutch of the drivingwheel. To engage the clutch members, the lever 27 is to be operated to force the auxiliary rod inward, and this rod will obviously force the rod 21 inward, which by bearing at its inner end against the cross-head 16 will move the cross-head, so that the clutch member 14 will engage with the clutch member 13.

In Fig. 3 I have shown the device as well adapted for small winding-drums or where great power is not required. In this arrangement the driving-shaft 10 has its hollow portion extended through the hub 28 of the winding-drum, and a rod 29 extends into this hollow portion, which answers both to move the winding-drum to clutch position or to move it therefrom. At opposite sides of the hub 28 the shaft 10 is provided with transverse openings, and the rod 29 is also provided with transverse openings. A pin or cross-head 30 extends through said openings at one side of the hub, and a similar pin 31 extends through the openings at the opposite side of the hub. Between the pin or cross-head 30 and the hub is a ring 32, while a similar ring 33 is placed between the pin or cross-head 31 and its side of the hub. The operation of this device is substantially as before described in connection with Fig. 1. However, as stated, the rod 29 performs two services, moving the drum in both directions.

Having thus described my invention, I claim as new and desire to secure by Letters Patent—

1. A driving-shaft, a driving-wheel fixed thereon, a drum mounted loosely on the shaft, a clutch member carried by the drum, a clutch member carried by the driving-gear, the said shaft having a longitudinal bore and transverse openings, a tubular shaft extended into said bore and having a transverse opening, a cross-head extended through said opening and through the openings in the first-named shaft, a connection between said cross-head and the drum, a thrust-rod extending through the tubular shaft and having bearings at its inner end against the cross-head, an auxiliary thrust-rod engaging at its inner end with the adjacent end of the first-named thrust-rod, and means for causing an inward and outward movement of said auxiliary thrust-rod, whereby the winding-drum may be moved in either direction, substantially as specified.

2. A driving-shaft, a driving-wheel fixed thereon, a drum mounted loosely on the shaft, a clutch member carried by the drum, a clutch member carried by the driving-wheel, the said shaft having a longitudinal bore and transverse openings, a tubular shaft extended into said bore and having a transverse opening, a cross-head extended through said opening and through the openings in the shaft, a connection between said cross-head and the drum, a yoke in which the outer end of said tubular shaft has a bearing, a thrust-rod extended through the tubular shaft and bearing at its inner end against the cross-head, an auxiliary thrust-rod having a bearing in the opposite wall of the yoke and engaging at its inner end with the adjacent end of the first-named thrust-rod, and means for causing an inward and outward movement of said auxiliary thrust-rod, whereby the winding-drum may be moved in either direction, substantially as specified.

3. A driving-shaft, a driving-wheel mounted thereon, a winding-drum loosely mounted on the shaft, a clutch member carried by the drum, a clutch member carried by the wheel, the said shaft having a longitudinal bore and transverse openings, a tubular shaft extended into said bore and having a transverse opening at its inner end, a cross-head extended through said transverse openings, a collar engaging in an annular channel formed in the hub of the drum, connections between said collar and the cross-head, a cup-shaped yoke adapted to contain oil and in the forward wall of which the tubular shaft has a bearing, a thrust-rod extended through said tubular shaft and bearing at its inner end against the cross-head, the opposite end being extended into the yoke, a casing in which the yoke is arranged, an auxiliary thrust-rod having a bearing in the opposite wall of said yoke and engaging at its inner end against the first-named thrust-rod, a sleeve longitudinally adjustable on the auxiliary thrust-rod and having an exterior screw-thread to engage a thread in a wall of the casing, and an operating-lever connected to said sleeve, substantially as specified.

4. A driving-shaft, a driving-wheel mounted thereon, a winding-drum, a clutch member carried by the drum, a clutch member carried by the wheel, a pillow-block in which the shaft has a bearing, the said shaft being made tubular for a portion of its length, a tubular shaft extended into the tubular portion of the driving-shaft, each of said shafts having transverse openings, a cross-head extended through said openings, a connection between said cross-head and the winding-drum, a casing attached to the pillow-block, a cup-shaped yoke arranged in said pillow-block and in one wall of which the tubular shaft has a bearing, said tubular shaft having a flange at its end for engaging against the inner surface of said wall of the yoke, an auxiliary shaft having a bearing in the opposite wall of the yoke and provided with a collar or flange for engaging against the inner side of the wall, an externally-threaded sleeve on the auxiliary rod, means for clamping the sleeve on the rod, the threaded portion of said sleeve engaging with a thread formed in an opening in a wall of the casing, means for rotating the sleeve, and a thrust-rod extended through the tubular shaft and engaging at one end with the cross-head and at the opposite end with the auxiliary thrust-rod, substantially as specified.

In testimony whereof I have signed my name to this specification in the presence of two subscribing witnesses.

STOCKTON BARTRON.

Witnesses:
    WILLIAM A. SHAFER,
    STEWARD FLAGLER.